United States Patent [19]
Schweitzer, Jr.

[11] 3,715,742
[45] Feb. 6, 1973

[54] ALTERNATING CURRENT FAULT INDICATING MEANS

[75] Inventor: Edmund O. Schweitzer, Jr., Northbrook, Ill.

[73] Assignee: E. O. Schweiter Manufacturing Co., Inc., Mundelein, Ill.

[22] Filed: June 1, 1971

[21] Appl. No.: 148,440

[52] U.S. Cl. .................................. 340/253 A, 317/23
[51] Int. Cl. ............................................. G08b 21/00
[58] Field of Search.340/248 B, 248 C, 253 R, 253A, 340/253 C; 324/51; 307/94; 317/36 TD, 23

[56] References Cited

UNITED STATES PATENTS 3,375,510   3/1968   Pitches ........................... 340/253 A

*Primary Examiner*—John W. Caldwell
*Assistant Examiner*—Daniel Myer
*Attorney*—Robert R. Lockwood

[57] ABSTRACT

Fault current flow in an alternating current carrying conductor is shown by operation of a target to fault indicating position from which it is restored in response to the energizing voltage of the conductor. A C-shaped magnetic core embraces the conductor and has a winding thereon the output of which is rectified and, when it reaches a predetermined value, is applied to a trip winding of a fault indicator to operate the target. A reset winding of the fault indicator is energized from a capacitor that is charged from the conductor voltage a source of which may be obtained from a capacitor plate embedded in the insulation of a conductor terminator. In a modification alternating current is applied to the trip winding to demagnetize the magnetic core of the indicator and allows a permanent magnet to bias the target to fault indicating position. Other modifications include energization of the reset circuit from the secondary winding of a distribution transformer, provision for magnetizing the distal ends of a U-shaped yoke embracing a conductor carrying fault current, and application of the yoke to the conductor of a pad mounted switching arrangement for a transformer.

17 Claims, 10 Drawing Figures

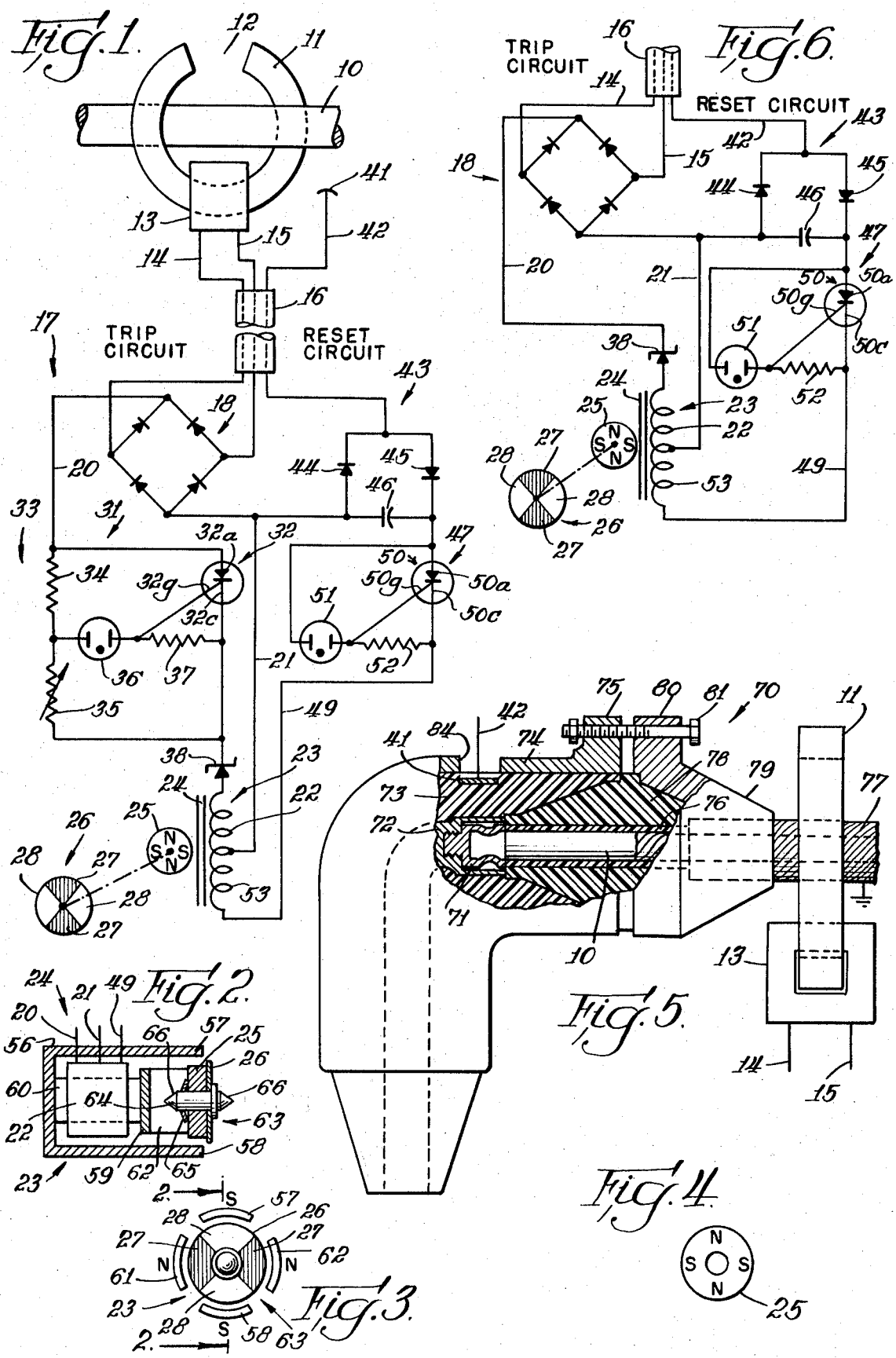

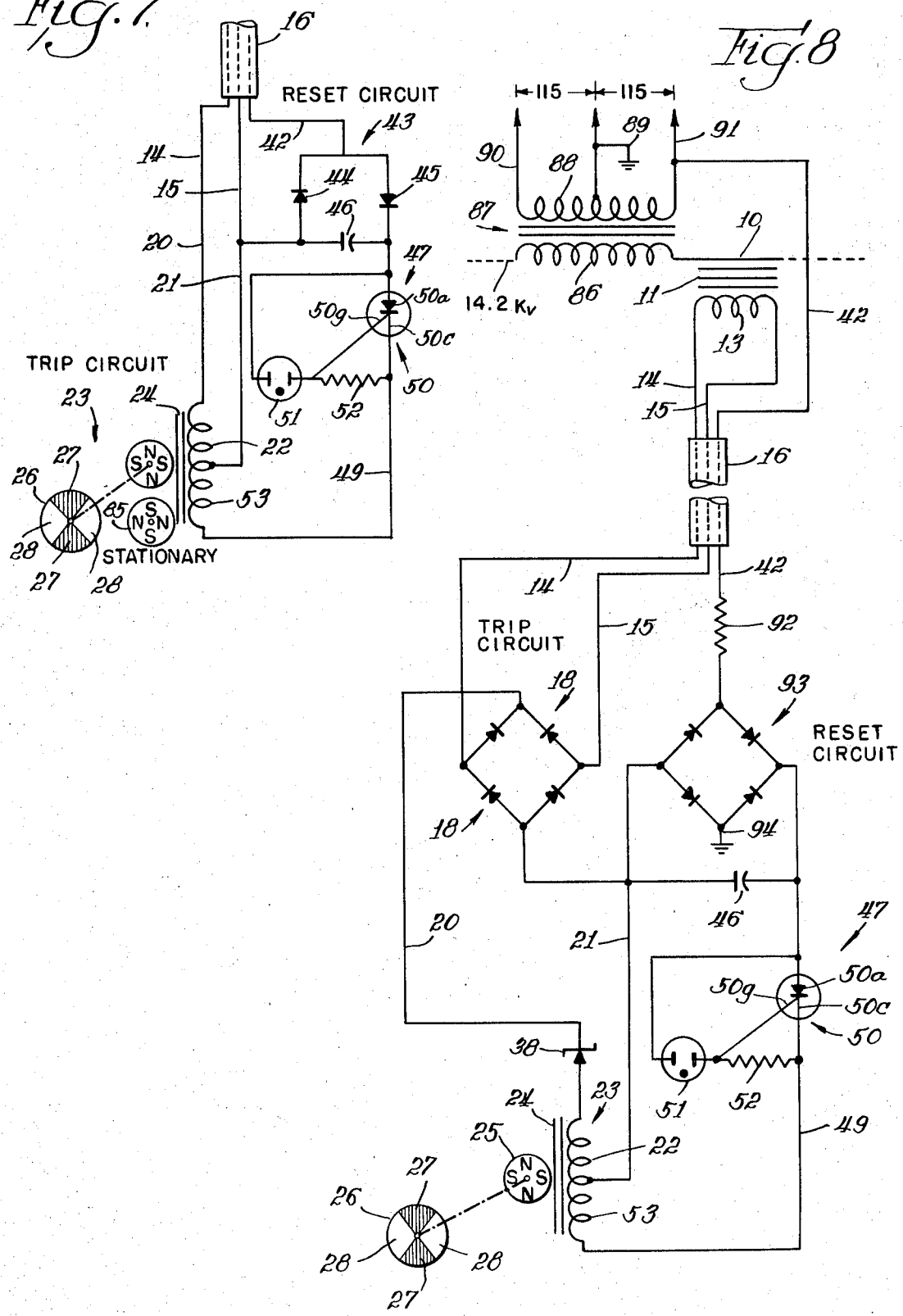

ALTERNATING CURRENT FAULT INDICATING MEANS

This invention relates to automatically resettable alternating current fault indicators and is an improvement over the disclosures of U.S. Pat. Nos. 3,348,099 issued Oct. 17, 1967, 3,426,276 issued Feb. 4, 1969, and 3,558,984 issued Jan. 26, 1971, and of application Ser. Nos. 55,532 filed July 16, 1970, and 119,639, filed Mar. 1, 1971.

Among the objects of this invention are: To provide an indication of flow of fault current in an alternating current carrying conductor and to restore the indicator to non-indicating condition in accordance with the voltage of the conductor with respect to ground or another conductor; to provide the fault indicator with trip and reset windings on a magnetic core having poles cooperating with poles of a permanent magnet movable with a target between fault indicating and non-indicating positions; to rectify the output of a winding on a magnetic core linking the conductor and when the rectified output exceeds a value corresponding to flow of fault current in the conductor, to apply it to the trip winding of the indicator; to charge a capacitor to a value corresponding to the voltage energizing the conductor and when the charge reaches this value, to apply it to reset the winding of the indicator; to apply the output of the winding on the magnetic core linking the conductor to the trip winding for demagnetizing the magnet core of the indicator to permit a permanent magnet to bias the target to fault indicating position; to provide a capacitor plate embedded in the insulation of a conductor terminator for connection to the rectifiers employed for charging the capacitor; to locate the indicator remotely from the conductor; to energize the reset winding from the secondary of a distribution transformer; to magnetize the distal ends of a magnetic yoke embracing a fault current carrying conductor; and to apply the yoke to the bus bar of a pad mounted switching system for a transformer.

In the drawings:

FIG. 1 illustrates, diagrammatically, a resettable fault indicator embodying this invention.

FIG. 2 is a vertical sectional view taken generally along line 2—2 of FIG. 3 to show the details of construction of the fault indicator including a movable target and parts immediately associated therewith.

FIG. 3 is a view, in end elevation looking from right to left, of the construction shown in FIG. 2.

FIG. 4 is a plan view of the permanent magnet that is movable with the target of the fault indicator.

FIG. 5 is a view that corresponds to FIG. 1 of Tachick U.S. Pat. No. 3,513,394 issued May 19, 1970, and shows a typical conductor terminator with which the present invention can be embodied.

FIG. 6 shows diagrammatically a fault indicator system, such as that illustrated in FIG. 1, with the exception that the fault current responsive circuit shown in FIG. 1 is omitted and reliance is placed on a zener diode for controlling the energization of the trip winding of the fault indicator.

FIG. 7 illustrates diagrammatically how the fault indicator can be operated by application of alternating current to the trip winding of the fault indicator.

FIG. 8 shows a system, similar to that illustrated in FIG. 1, in which the reset circuit is energized from the secondary winding of a distribution transformer.

Figure 9:
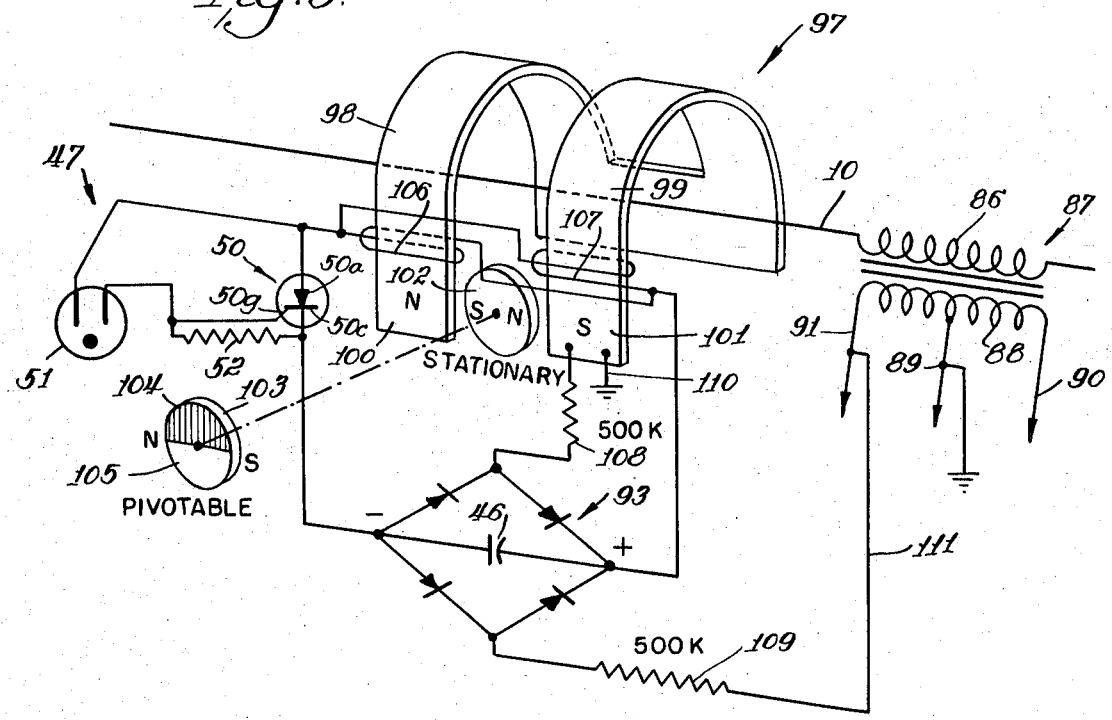

FIG. 9 shows a U-shaped yoke embracing the conductor and responsive to flow of fault current for tripping the indicator and responsive to the secondary voltage for resetting the indicator.

Figure 10:
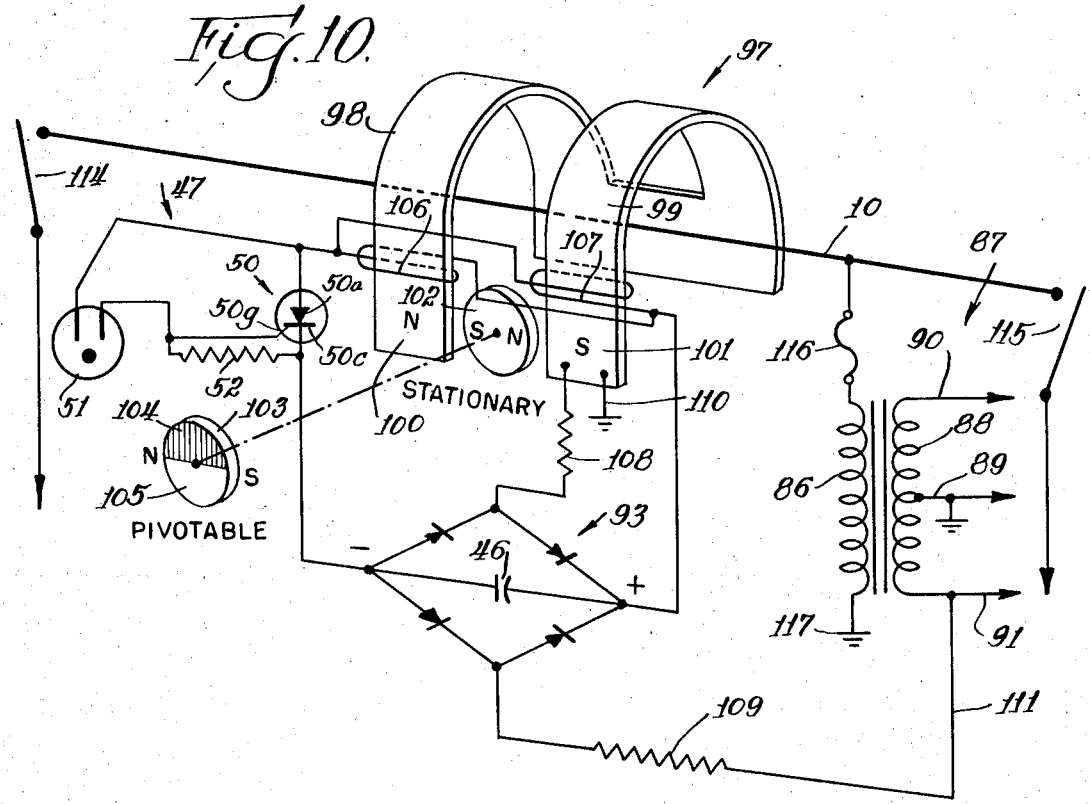

FIG. 10 shows a system, similar to that shown in FIG. 9, in which the U-shaped yoke embraces the bus bar of a pad mounted transformer which is connected by disconnecting switches in a loop circuit.

Referring now particularly to FIG. 1, the reference character 10 designates a conductor of an electric power distribution system operating at 60 Hz and at a voltage that may range upwardly from 7.5 KV and in which the normal load current may be of the order of 100, 200, 450, or 1000 amperes. The conductor 10 may be mounted overhead or it may be located underground and arranged to energize the primary windings of transformers that are mounted on concrete pads at ground level or they may be located in vaults below ground level. A typical application is illustrated in McNulty U.S. Pat. No. 3,377,487 issued Apr. 9, 1968. However, other arrangements, voltages and currents for the conductor 10 may be employed.

A C-shaped magnetic core 11 embraces the conductor 10. The core 11 has a fixed air gap 12 which is large enough to permit application to the conductor 10. Suitable means, not shown, are employed for holding the magnetic core 11 in position on the conductor 10. A current winding 13 links the magnetic core 11 and from it conductors 14 and 15 extend through flexible insulating tubing 16 to energize a trip circuit, shown generally at 17, which includes a full wave rectifier that is indicated, generally, at 18. It will be understood that the voltage across the output terminals of the rectifier 18 is an unidirectional voltage, the value of which corresponds to the current induced in the current winding 13 which is a function of the magnitude of the current flow in the conductor 10.

The output terminals of the rectifier 18 are connected by conductors 20 and 21 across a trip winding 22 of a remotely located fault indicator that is shown, generally, at 23. The fault indicator 23 includes a magnetic core 24 the details of construction of which will be set forth hereinafter. Associated with the magnetic core 24 is a permanent magnet 25 that is movable with a target or indicating disc 26. The target or indicating disc 26 is provided with red sections 27 and white sections 28 and is arranged to be moved with respect to a suitable mask through 90° so that either the red sections 27 are visible or the white sections 28 are visible. When the red sections 27 are visible the fault indicator 23 shows that fault current has flowed through the conductor 10.

Interposed in the conductor 20 is a fault current responsive circuit that is indicated, generally, at 31. The fault current responsive circuit 31 includes an SCR or voltage sensitive switch that is indicated, generally, at 32. The SCR 32 includes an anode 32a, a cathode 32c, and a gate 32g. Associated with the SCR 32 is a voltage divider that is indicated, generally, at 33 and comprises a resistor 34 and a variable resistor 35. The voltage divider 33 is connected across the anode 32a and the cathode 32c. Interposed between the gate 32g and the common connection between the resistor 34 and variable resistor 35 is a glow discharge device or neon lamp 36. A leakage resistor 37 interconnects the gate 32g and the cathode 32c. In series with the fault current responsive circuit 31 is a zener diode 38 which allows the SCR 32 to turn off or to become non-conducting since the zener diode 38 clips the lower one fourth of a full wave rectified wave and thereby opens the circuit.

For resetting the target or indicator disc 26 to the non-indicating position a capacitor plate 41 is employed in spaced relation to the conductor 10. The capacitor plate 41 is charged to a voltage which corresponds to the voltage at which the conductor 10 is energized. The capacitor plate 41 is connected by a conductor 42 to energize a reset circuit that is indicated, generally, at 43. The conductor 42 extends through the flexible tubing 16 and thus permits location of the trip circuit 17, reset circuit 43 and the fault indicator 23 remotely from the conductor 10 and from the magnetic core 11. The reset circuit 43 employs the capacitor charging circuit that is shown in Schweitzer et al U. S. Pat. No. 3,348,099 issued Oct. 17, 1967. It includes rectifiers 44 and 45 that are connected in series with the conductor 42 being connected, as shown, to the common connection therebetween. A capacitor 46 is connected across the rectifiers 44 and 45. The capacitor plate 41, conductor 42 and rectifiers 44 and 45 provide conductive circuit means for directly interconnecting the capacitor 46 and the conductor 10 with the result that the capacitor 46 is charged to a unidirectional voltage which corresponds to the alternating energizing voltage of the conductor 10. Associated with the capacitor 46 is a voltage responsive circuit that is indicated, generally, at 47. It is interposed in a conductor 49 which, together with the conductor 21, forms a part of the reset circuit 43. The voltage responsive circuit 47 includes an SCR that is indicated, generally, at 50 and includes an anode 50a, a cathode 50c and a gate 50g. A glow discharge device or neon lamp 51 is connected between the anode 50a and the gate 50g. A leakage resistor 52 interconnects the gate 50g and the cathode 50c. The reset circuit is connected across a reset winding 53 which is located on the magnetic core 24 of the remotely located fault indicator 23. It will be observed that the windings 22 and 53 comprise together a center tapped operating winding and that they may be individual windings if desired.

In describing the operation of the system shown in FIG. 1 it will be assumed that the target or indicator disc 26 is in the fault indicating position which shows that fault current has flowed through the conductor 10. When this occurs presumably a fuse or other circuit interrupting device has opened the circuit for energizing the conductor 10 and that the fault has been removed. On reenergization of conductor 10 current flows therein which depends upon the load connected thereto. However, in accordance with this invention if only energizing voltage is applied to the conductor 10 and no current flows therethrough, the fault indicator 23 will be reset to the non-indicating position. On application of energizing voltage to the conductor 10, the capacitor 46 of the reset circuit 43 is charged to a unidirectional voltage which corresponds to the energizing voltage of the conductor 10. The time required for charging the capacitor 46 depends upon the circuit constants. When the capacitor 46 is fully charged the glow discharge device or neon lamp 51 is rendered conducting, current flows through the gate 50g and the SCR 50 becomes conducting. Energizing voltage is applied to the reset winding 53 and the permanent magnet 25 is pivoted through 90° to shift the target or indicator disc 26 to the non-indicating position.

On flow of fault current through the conductor 10 a corresponding current flows through the current winding 13 and a corresponding voltage is applied across the input terminals of the full wave rectifier 18. This voltage is sufficient to render the flow discharge device or neon lamp 36 conducting and, in turn, the SCR 32 is rendered conducting. Sufficient voltage then is applied to the zener diode 38 and it becomes conducting to complete the energizing circuit for the trip winding 22. The permanent magnet 25 and the target or indicator disc 26 then are pivoted through 90° to the fault indicating position.

FIGS. 2, 3 and 4 show the details of construction of the fault indicator 23. The magnetic core 24 is formed, in part, by a generally C-shaped outer yoke section 56 which provides poles 57 and 58. The magnetic core 24 also comprises an inner C-shaped yoke section with a connecting section 60 between it and the outer yoke section 56. The inner yoke section 59 forms poles 61 and 62 between the poles 57 and 58. For illustrative purposes the poles 57 and 58 are shown as being polarized with south poles while the poles 61 and 62 are polarized with north poles. The actual polarities depend upon the energizations of the trip winding 22 and the reset winding 53. The permanent magnet 25 and the target or indicator disc 26 form parts of an indicator assembly as indicated, generally, at 63. They are mounted on a hub 64 and secured thereto by a retaining washer 65. Conical bearing portions at the ends of the hub 64 provide for pivotally mounting the indicator assembly 63.

FIG. 5 shows how the system illustrated in FIG. 1 can be applied in conjunction with a conventional or typical terminator that is indicated, generally, at 70. Here it will be observed that the conductor is provided with a threaded contact 71 which is arranged to be screwed into an elbow shaped conductor 72 which is surrounded by insulation 73 that is encased in a metal sheath 74. The metal sheath 74 has a shoulder 75 extending radially therefrom. The conductor 10 is surrounded by insulation 76 and for the part external to the terminator 70 it is also surrounded by a metallic ground sheath 77. The conductor 10 is further surrounded by an insulating sealing member 78 a part of which is enclosed by a metallic ferrule 79 having a shoulder 80. The shoulders 75 and 80 are secured together by a bolt 81. An opening 84 is provided in the metal sheath 78 through which conductor 42 extends for connection to the capacitor plate 41 which is embedded in the insulation 73.

The magnetic core 11 embraces the conductor 10 exteriorly of the terminator 70 with the current winding 13 positioned thereon. The conductors 14, 15 and 42 are suitably arranged in the flexible tubing 16 for connection to the trip circuit 17 and reset circuit 43.

FIG. 6 shows a circuit which is identical with the circuit shown in FIG. 1 except for the omission of the fault current responsive circuit. In FIG. 6 reliance is placed solely on the characteristic of the zener diode 38 to become conducting on application of a unidirectional voltage thereto which corresponds to a particular fault current flow in the conductor 10. For operation at different fault currents, a different zener diode 38 is employed. The use of the fault current responsive circuit 31 in FIG. 1 through adjustment of the variable resistor 35 permits changing the fault current at which the fault indicator 23 is operated to indicate that a fault has occurred on the conductor 10. However, where such adjustment is not required and where the operating characteristics of a zener diode are satisfactory, it alone can be employed.

FIG. 7 illustrates how the trip circuit 17 can be modified by omission of the full wave rectifier 18, fault current responsive circuit 31 and the zener diode 38. In FIG. 7 the conductors 14 and 15 are connected directly to the conductors 20 and 21 with the result that alternating current is applied to the trip winding 22. When fault current flows through the conductor 10 the alternating current flowing through the trip winding 22 generates an alternating magnetic field which demagnetizes the magnetic core 24. A stationary permanent magnet 85 is mounted on the fault indicator 23 between the permanent magnet 25 and the inner yoke section 59. When the magnetic core 24 is demagnetized in the manner described, the stationary permanent magnet 85 biases the permanent magnet 25 to the fault indicating position where opposite poles of the movable permanent magnet 25 are adjacent opposite poles of the stationary permanent magnet 85. On re-energization of the conductor 10 the reset winding 53 is energized in the manner previously described so that the magnetic core 24 is energized with unidirectional magnetic flux sufficient to overcome the biasing action of the magnetic flux from the poles of the stationary permanent magnet 85. Thereupon the target or indicator disc 26 is pivoted to the non-indicating position.

In FIG. 8 the high voltage conductor 10 is shown connected to a primary winding 86 of a distribution transformer that is indicated, generally, at 87. The magnetic core 11 and current winding 13 are associated with the conductor 10 for energizing conductors 14 and 15 under fault current conditions, as previously described, to operate the fault indicator 23. The transformer 87 has a low voltage secondary winding 88 that is provided with a grounded center tap 89 and conductors 90 and 91 energized at nominal voltages of 115 volts with respect to ground.

Here the conductor 42 is connected for energization to conductor 91 and through a resistor 92 to a full wave rectifier bridge indicated generally at 93 which is employed instead of the series connected rectifiers 44 and 45. The rectifier bridge 93 is grounded at 94.

In operation, on flow of fault current in conductor 10, the fault indicator 23 is operated in the manner previously described to shift the target or indicator disc 26 to the alternate position. Presumably, the fault will be cleared by opening the circuit by a fuse or circuit breaker. The transformer 87 then is de-energized. On removal of the fault and re-energization of the transformer 87, reset voltage is applied across the full wave rectifier 93, from the secondary winding 88, the capacitor 46 is charged, and reset winding 53 is energized to restore the target or indicator disc to the non-indicating or normal position.

FIG. 9 shows a self resetting fault indicating system that employs a bifurcated yoke, indicated generally at 97, of the kind and character described in U.S. Pat. No. 3,426,276, issued Feb. 4, 1969. The yoke 97 has U-shaped arms 98 and 99 embracing the conductor 10 which is connected to energize the primary winding 86 of the transformer 87. Between the distal ends 100 and 101 of the arms 98 and 99 there is positioned a stationary ceramic magnet 102 having poles along its diameter as indicated. Associated with the stationary magnet 102 is a pivotable ceramic magnet 103 carrying red and white target areas 104 and 105. Magnetizing windings 106 and 107, connected in parallel, are positioned on the distal ends 100 and 101 and are energized from the capacitor 46 when the SCR 50 is rendered conducting. The capacitor 46 is charged from the rectifier bridge 93 which is connected through resistors 108 and 109 for energization between the yoke 97 that is grounded at 110, and conductor 111 which is connected to secondary conductor 91.

Under normal operating conditions the SCR 50 is conducting to charge the capacitor 46 and energize windings 106 and 107 to magnetize the distal ends 100 and 101 with polarities opposite to the polarities of the magnet 102 to hold the pivoted magnet 103 in a position 180° from that shown in FIG. 9. On flow of alternating fault current in the conductor 10, the distal ends 100 and 101 are demagnetized. Magnet 102 then pivots the magnet 103 to the position shown in FIG. 9 to indicate that a fault has occurred. The circuit is interrupted by a fuse or circuit breaker and the conductor 10 and transformer 87 are de-energized. On re-energization of the conductor 10, the transformer 87 is energized, capacitor 46 is charged, SCR 50 is rendered conducting, and windings 106 and 107 are energized to magnetize the distal ends 100 and 101, and pivot the magnet 105 to the normal or non-indicating position.

In FIG. 10 the conductor 10 comprises a bus bar which is embraced by the yoke 97. Disconnecting switches 114 and 115 connect the conductor 10 in a loop circuit. A fuse 116 interconnects the conductor 10 and the primary winding 86 which is grounded at 117. Otherwise the system shown in FIG. 10 is the same as illustrated in FIG. 9, and operates in the manner previously described.

I claim:

1. Means responsive to flow of alternating fault current in and high voltage energization of a conductor comprising: means for responding to current flow in said conductor, capacitor means, reset rectifier means, conductive circuit means for directly interconnecting said capacitor means and said conductor through said rectifier means to charge said capacitor means to a unidirectional voltage corresponding to the alternating energizing voltage of said conductor, and fault indicating means remote from said conductor including: a target, a magnetic core, a trip winding on said magnetic core circuit means interconnecting said trip winding and said current flow responsive means for moving said target from a non-indicating position to a fault indicating position in response to flow of fault current in said conductor, and a reset winding on said magnetic core connected to be energized from said capacitor means for moving said target from said fault indicating position to said non-indicating position on application of energizing voltage to said conductor and current flow therein less than fault current flow.

2. Current and voltage responsive means according to claim 1 wherein said means for responding to current flow in said conductor includes a magnetic core for linking said conductor and a current winding linking the last mentioned magnetic core.

3. Current and voltage responsive means according to claim 2 wherein rectifier means interconnects said current winding and said trip winding through a zener diode rendered conducting on flow of fault current in said conductor, and voltage sensitive switch means connected between said capacitor means and said reset winding is rendered conducting when said capacitor means is charged to said unidirectional voltage.

4. Current and voltage responsive means according to claim 1 wherein rectifier means interconnects said current flow responsive means and said trip winding through a zener diode rendered conducting on flow of fault current in said conductor.

5. Current and voltage responsive means according to claim 4 wherein voltage sensitive switch means connected between said rectifier means and said trip winding is rendered conducting on flow of fault current in said conductor.

6. Current and voltage responsive means according to claim 1 wherein said trip winding is energized with alternating current, permanent magnet means connected to said target is responsive to the magnetic field from said reset winding, and stationary permanent magnet means react with said target permanent magnet means to shift said target to fault indicating position on flow of fault current in said conductor and demagnetization of said magnetic core.

7. Current and voltage responsive means according to claim 1 wherein voltage sensitive switch means connected between said capacitor means and said reset winding is rendered conducting when said capacitor means is charged to said unidirectional voltage.

8. Current and voltage responsive means according to claim 1 wherein said conductive circuit means includes a capacitor plate capacitively coupled to said conductor.

9. Current and voltage responsive means according to claim 8 wherein said conductor is enclosed in insulator terminator means, and said capacitor plate is embedded in the insulation of said terminator means.

10. Means responsive to flow of alternating fault current in and energization of a conductor comprising: means responsive to flow of current in said conductor, a transformer including a primary winding connected for energization to said conductor and a secondary winding, capacitor means, reset rectifier means connected for energization to said secondary winding to charge said capacitor to a unidirectional voltage corresponding to the voltage of said secondary winding, and fault indicating means including: trip means operated by said current responsive means on flow of fault current in said conductor, and reset winding means connected to be energized from said capacitor means on application of energizing voltage to said conductor accompanied by energization of said secondary winding.

11. Fault current and conductor energization responsive means according to claim 10 wherein said means for responding to current flow in said conductor includes a magnetic core for linking said conductor and a current winding linking said magnetic core.

12. Fault current and conductor energization responsive means according to claim 10 wherein voltage sensitive switch means connected between said capacitor means and said reset winding means is rendered conducting when said capacitor means is charged to said unidirectional voltage.

13. Fault current and conductor energization responsive means according to claim 10 wherein disconnecting switches connect said conductor in a loop circuit.

14. Means responsive to flow of alternating fault current in and energization of a conductor comprising: means responsive to flow of current in said conductor including a demagnetizable magnetic core embracing said conductor, a transformer including a primary winding connected for energization to said conductor and a secondary winding, capacitor means, reset rectifier means connected for energization to said secondary winding to charge said capacitor to a unidirectional voltage corresponding to the voltage of said secondary winding, and fault indicating means including: trip means operated by said current responsive means on flow of fault current in said conductor, and reset winding means mounted on said magnetic core and connected to be energized from said capacitor means on application of energizing voltage to said conductor accompanied by energization of said secondary winding after demagnetization of said magnetic core by flow of fault current in said conductor.

15. Fault current and conductor energization responsive means according to claim 14 wherein voltage sensitive switch means connected between said capacitor means and said reset winding means is rendered conducting when said capacitor means is charged to said unidirectional voltage.

16. Fault current and conductor energization responsive means according to claim 15 wherein said magnetic core provides a pair of opposite poles, a stationary permanent magnet has poles adjacent unlike poles of said magnetic core, and a pivotable permanent magnet adjacent said stationary permanent magnet takes up a normal position when the magnetic field from said poles of said magnetic core is greater than the magnetic field from said poles of said permanent magnet and a fault indicating position when said magnetic core is demagnetized by flow of fault current in said conductor.

17. Fault current and conductor energization responsive means according to claim 14 wherein said secondary winding has a grounded center tap, said magnetic core is grounded, and circuit means interconnect said reset rectifier means between said magnetic core and a terminal of said secondary winding.

* * * * *